United States Patent
Ziegele

[11] 3,888,142
[45] June 10, 1975

[54] POWER DRIVE DOLLY WITH TWO-SPEED DRIVE SYSTEM

[75] Inventor: Heinrich H. Ziegele, South Euclid, Ohio

[73] Assignee: White Motor Corporation, Cleveland, Ohio

[22] Filed: Aug. 26, 1971

[21] Appl. No.: 175,131

[52] U.S. Cl. .................. 74/852; 180/14 A; 74/856
[51] Int. Cl. .............................................. B60k 21/04
[58] Field of Search ..... 180/14 A, 14 R; 280/415 B, 280/418; 74/851, 857, 858, 856, 339, 852, 336, 866, 752 D

[56] References Cited
UNITED STATES PATENTS

| | | | |
|---|---|---|---|
| 2,161,153 | 6/1939 | Gallun et al. | 180/14 A |
| 2,626,000 | 1/1953 | Yergens | 180/14 R |
| 2,658,408 | 11/1953 | Miller | 74/866 |
| 2,662,418 | 12/1953 | Flinn | 74/852 |
| 2,686,434 | 8/1954 | Long | 74/858 |
| 2,914,128 | 11/1959 | Christie | 180/14 R X |
| 3,027,962 | 4/1962 | Wolf | 180/14 A |
| 3,052,134 | 9/1962 | Worster | 74/336 X |
| 3,103,826 | 9/1963 | Jaeschke | 74/339 |
| 3,182,778 | 5/1965 | Droschel | 74/339 X |
| 3,209,850 | 10/1965 | Fish | 180/14 A |
| 3,479,055 | 11/1969 | Cunha et al. | 280/415 B X |
| 3,612,202 | 10/1971 | Moon | 180/14 A |
| 3,641,844 | 2/1972 | Wakamatsu et al. | 74/866 X |

FOREIGN PATENTS OR APPLICATIONS

| | | | |
|---|---|---|---|
| 1,078,451 | 3/1960 | Germany | 180/14 R |

*Primary Examiner*—Kenneth H. Betts
*Attorney, Agent, or Firm*—Watts, Hoffmann, Fisher & Heinke Co.

[57] ABSTRACT

An over-the-highway vehicle including a power drive dolly having a drivable axle coupled by a flexible power transmitting means to a tractor. A two speed drive system drives the dolly axle and includes a drive input selectively engageable with a low speed and a high speed output. A control system is provided to upshift and downshift the drive system. The control system includes timing means for providing a timed deceleration of the drive input during upshift following disengagement with the low speed output and preceding engagement with the high speed output. The timing means also serves to provide a timed acceleration of the drive input during downshift following disengagement with the high speed output and preceding engagement with the low speed output.

5 Claims, 3 Drawing Figures

POWER DRIVE DOLLY WITH TWO-SPEED DRIVE SYSTEM

1. FIELD OF THE INVENTION

The present invention relates to an over-the-highway vehicle and more particularly to an over-the-highway power drive dolly having a tow-speed drive system.

2. Prior Art

In modern over-the-highway tractor-trailer rigs, so-called tandem trailers provide efficient tractor and operator utilization. While efficient, the use of tandem trailer rigs has been somewhat limited because they are not lawful on many highways. On the other hand, their use is now permited on turnpikes and highways of the interstate systems.

Accordingly, it is not uncommon for each of a pair of tractors to pull a trailer to a limited access highway and then to couple the two trailers to one of the tractors for transport over the limitedaccess highway.

When trailers are pulled in tandem, the second trailer is coupled to the first by a dolly. The dolly typically is comprised of a frame equipped with a tongue for pivotal coupling to the lead trailer, an axle with spaced pairs of road wheels, and a fifth wheel for coupling the second trailer.

There have been proposals for dollies which are usable for coupling the first trailer to the second and which may be selectively connected to a tractor to convert the tractor from a single to a tandem-axle tractor. Thus, the tractor can be used as a tandem-axle tractor to pull a single trailer to a limited access highway and then converted to a single axle tractor with the dolly being used to couple a second trailer to the first.

One disadvantage of prior tractors equipped with removable dollies is that with such a tractor there is only a single driven axle. With only a single driven axle it is difficult to obtain desired acceleration and maintenance of high road speeds, even when a single trailer is being pulled and even more so when tandem trailers are being towed.

While there have been provisions for spaced drive axles on vehicles such as off-the-highway road vehicles, these over-the-highway dollies have not been so equipped. Clearly a dolly so equipped provides, when coupled to the tractor, a tractor which functions in the manner of one equipped with a tandem axle drive system and with improved results when a second drive axle is powered when tandem trailers are being hauled.

Two speed drive systems are known wherein drive gears of a first speed are disengaged, and drive gears of a second speed are synchronized prior to engagement. In addition, electrical control systems for effecting such synchronized gear shifting are also known.

However, most such electrical control systems include a plurality of tachometer generators connected to sense the speeds of various drive system components. Such control systems are expensive to build and maintain, and are not therefore suitable for use in over-the-road tractor-trailer trucks.

SUMMARY OF THE INVENTION

The present invention overcomes the foregoing drawbacks of prior art tandem trailer rigs and tandem drive systems, and provides an over-the-highway power drive dolly for distributing the motive power to two driven axles. The dolly includes road wheels mounted on a drivable axle carried by a dolly frame. A flexible drive transmitting shaft drivably couples the dolly axle to the prime mover of a tractor. By this arrangement, the dolly and tractor may each be coupled to separate trailers for powered transport of the trailers in tandem. When only a single trailer is being pulled by a tractor, the dolly may be coupled to the tractor in a known manner. When so coupled the flexible drive shaft can be disengaged and hung from the tractor or trailer. The flexible shaft will then normally be disconnected from the prime mover and drive of the tractor trailer rig is provided through the tractor's driven axle.

A number of significant advantages are had by distributing the motive power application along the payload, among which are improved traction and a smoother ride. Moreover, the substantial spacing that is provided between the tractor drive wheels and the dolly drive wheels distributes the driving forces which can result in one or the other of these drive systems having better traction than the other, such as in slippery conditions, whereby the one serves to substantially assist the other.

As will be apparent, when two trailers are coupled in tandem with the first trailer pulling the second, in many respects the frame of the first trailer is subjected to greater longitudinal tensile forces than it would encounter without the second trailer. Accordingly, another advantage of distributing the motive power application is the reduction in stress applied to the frame of the lead trailer of a pair connected in tandem. Thus, the provision of a power drive dolly for essentially independently moving the second trailer during over-the-highway operation, reduces stress applied to the frame of the first trailer.

In accordance with another aspect of the present invention, a power drive dolly is provided with a two speed drive system which may be upshifted, downshifted, or locked in neutral from a remote location such as the instrument panel of the operator's cab. Locked in neutral, the power drive dolly could be used like any other unpowered trailer dolly. Thus the power drive dolly is not limited to use as a powered unit, but rather can serve any dolly requirement, be it powered or unpowered.

Still another feature of the present invention is the provision of a simple two speed drive system including timing means to provide a timed deceleration of the drive input during upshift, and a timed acceleration of the drive input during downshift.

The drive system is provided with a drive input which is selectively engageable with low speed and high speed outputs. A control system is adapted to control the speed of the drive input and to effect upshifting and downshifting. During upshift, the control system performs the functions of (1) deenergizing the drive input, (2) disengaging the drive input from the low speed output, (3) timing a pre-selected interval of time during which the drive input decelerates, (4) engaging the input with the high speed output, and (5) re-energizing the drive input. During downshift, the control system performs the functions of (1) de-energizing the input, (2) disengaging the drive input from the high speed output, (3) re-energizing the input for a timed interval to accelerate the drive input, (4) de-energizing the input, (5) engaging the drive input with the low speed output, and (6) re-energizing the input.

The control system includes timing means to provide a timed deceleration and acceleration respectively during upshift and down shift. By proper selection of the time intervals for such acceleration and deceleration, the drive input is brought to a speed sufficiently within the range of the output to be engaged such that smooth engagement can take place. The present invention thereby obviates the need for complicated speed sensing tachometer generator means connected to the various drive system components.

Accordingly, it is the principal object of the present invention to provide a novel and improved power drive dolly with a two speed drive system.

Other objects and a fuller understanding of the invention may be had by referring to the following description and claims taken in conjunction with the accompanying drawings.

DESCRIPTION OF THE PREFERRED EMBODIMENT

Figure 1:
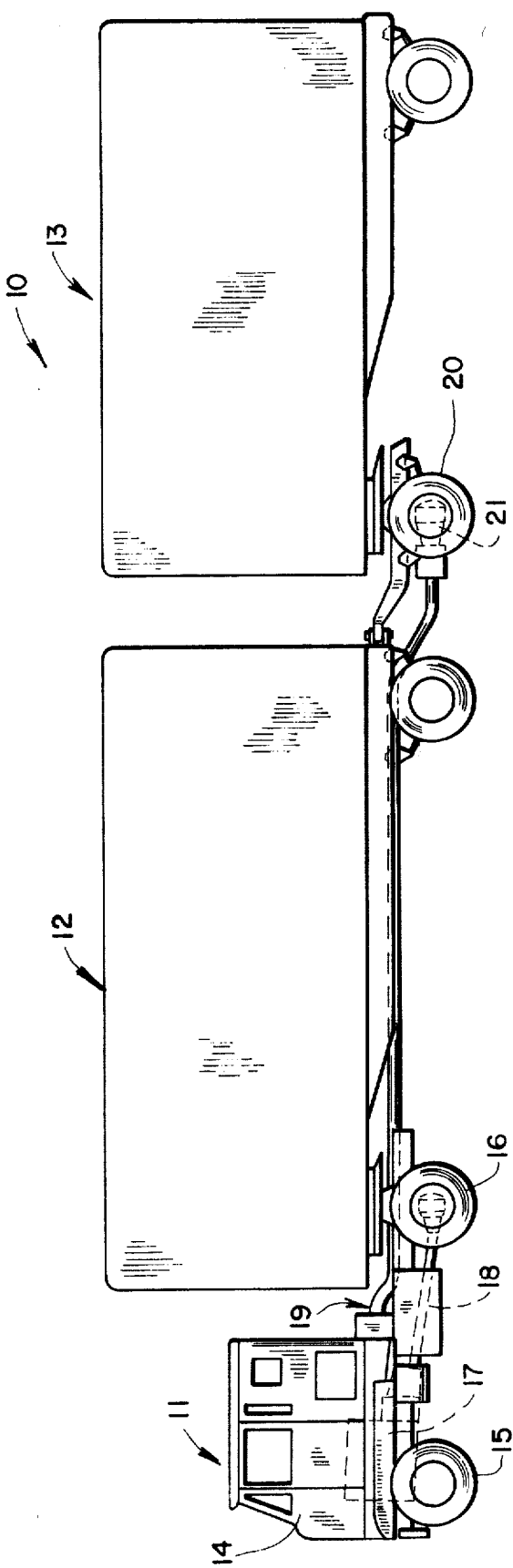
FIG. 1 is a elevational view of a tractor-trailer apparatus including a tractor, a pair of trailers and a power drive dolly drivingly connected to the tractor and supporting the second trailer.

Referring to FIG. 1, a tractor-trailer apparatus is shown generally at 10. The apparatus 10 includes a tractor 11 connected in tandem towing relationship with the first and second trailers 12, 13. The tractor 11 is provided with a cab 14 supported above front and rear wheels 15, 16. The cab 14 houses an engine 17.

Primary and secondary drive systems 18, 19 connect with the engine 17. The primary drive system 18 connects with a driving axle mounting rear wheels 16 of the tractor 11. The secondary drive system 19, comprising a flexible drive cable, similarly connects with an auxiliary drive dolly 20 provided beneath the second trailer 13. The auxiliary drive dolly 20 includes a two speed differential axle 21 which may be shifted from a low gear range to a high gear range.

The power drive dolly 20 is coupled to the first trailer 12 and supports the forward end of the second trailer 13. When the trailers 12 and 13 are disconnected from the tractor and power drive dolly, the dolly may be directly coupled to the tractor and the flexible drive cable 19 disconnected from the tractor and stored.

Figure 2:
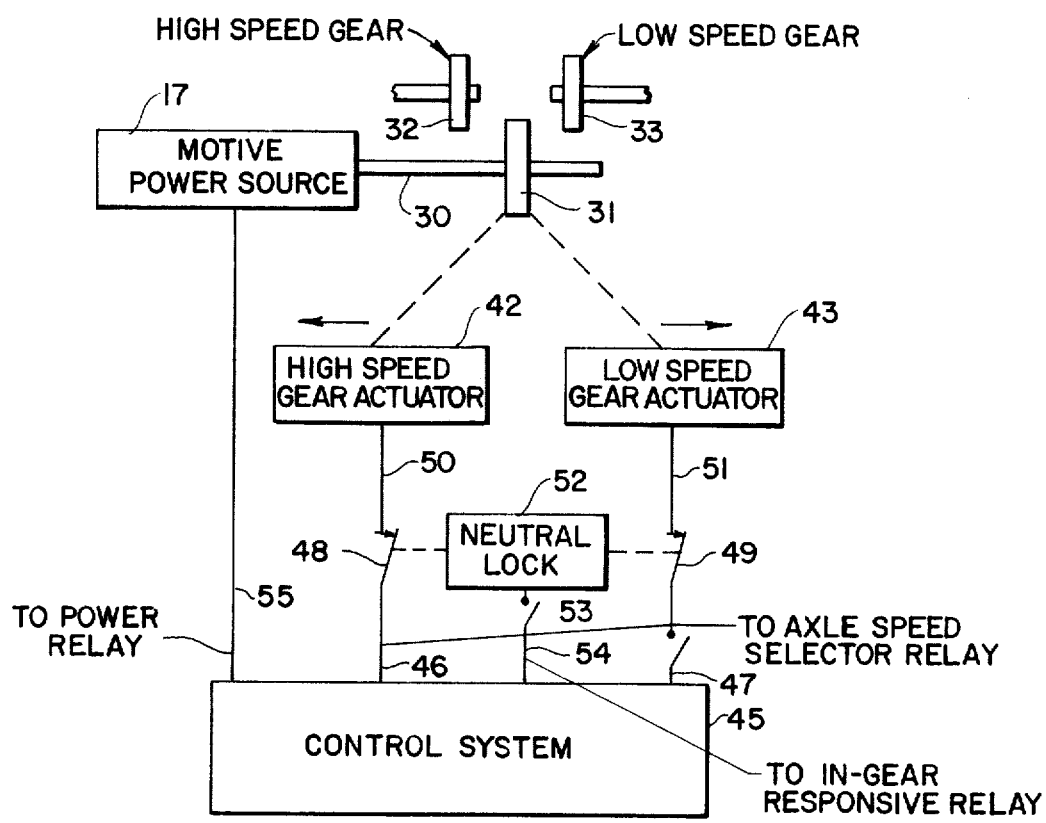
FIG. 2 is a schematic diagram illustrating the interconnection between a number of the components of the two speed drive system of the power drive dolly of the present invention; and, FIG. 3 is a schematic electrical circuit diagram illustrating one embodiment of the control system of the two speed drive of the present invention.

Referring to FIG. 2, the two speed drive system of the auxiliary drive dolly 20 is illustrated schematically. A motive power source, such as the tractor engine 17, connects through a drive shaft 30 with a drive input or drive gear 31. The drive input 31 is selectively engageable with a high speed output or gear 32 and a low speed output or gear 33. The high and low speed outputs 32, 33 are connected in the usual fashion to drive the axle 21 respectively at high speed or low speed relative to speed of the drive input 31.

High and low speed actuators 42, 43 are provided to selectively engage the drive input 31 respectively with the drive outputs 32, 33. A control system indicated generally by the numeral 45 is provided to selectively electrically energize the actuators 42, 43. Electrical conductors 46, 47 are provided to energize the actuators 42, 43. Normally closed switches 48, 49 connect the conductors 46, 47 to conductors 50, 51.

The switches 48, 49 comprise contacts of a neutral lock relay 52. The switches 48, 49 open when the neutral lock relay 52 is energized. The neutral lock relay 52 is connected for energization through a switch 53 to a conductor 54 and to the control system 45. By this arrangement, when the neutral lock relay 52 is energized, neither of the actuators 42, 43 can be energized.

A conductor 55 connects the control system 45 with the motive power source 17. The control system serves to control the energization and de-energization of the motive power source, and hence the speed and acceleration of the drive input 31.

Figure 3:
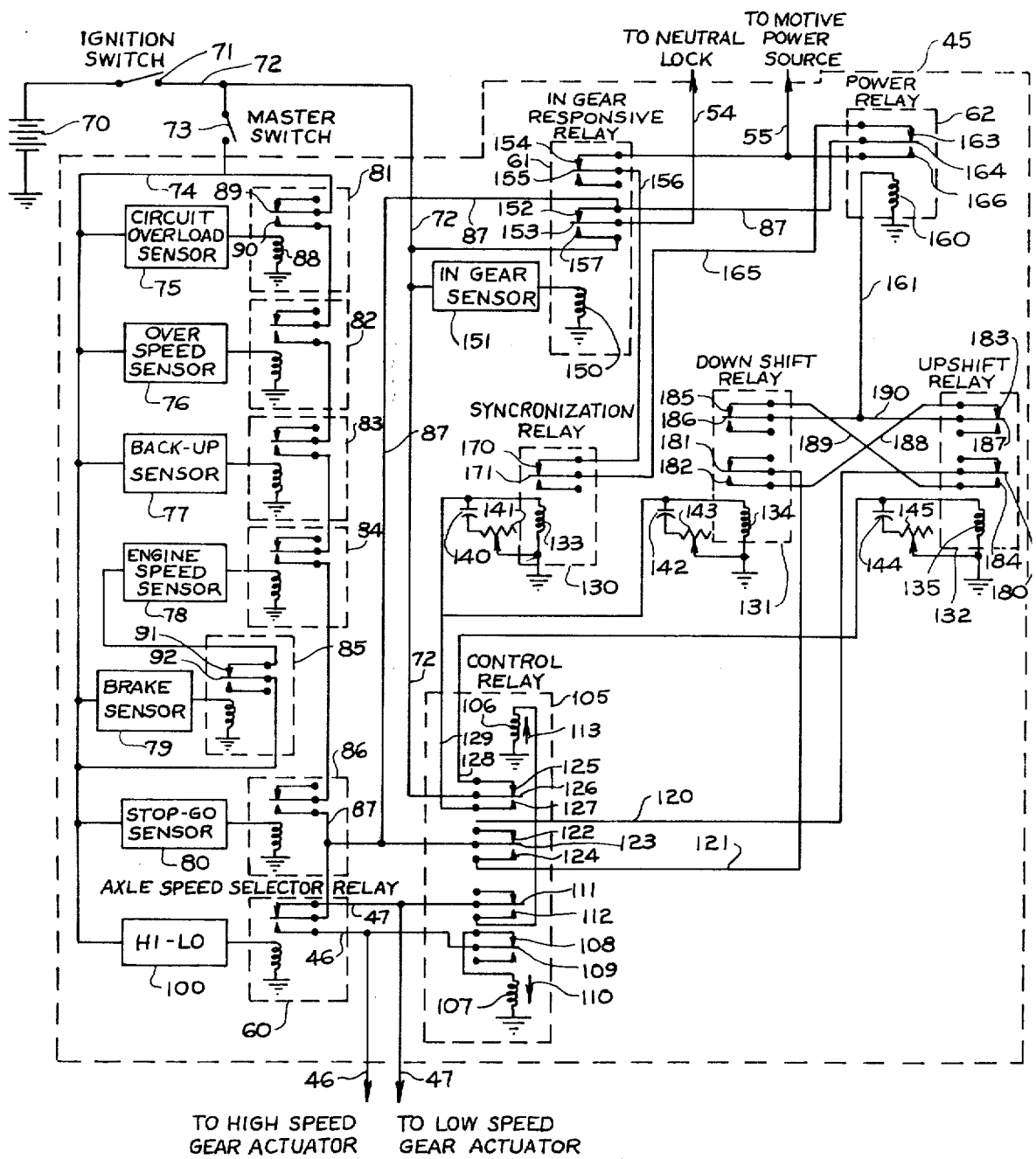

Referring to FIG. 3, the control system 45 is shown in more detail. As will be explained, the conductors 46, 47 connect with an axle speed relay 60, while the conductors 54 and 55 connect respectively with an in-gear responsive relay 61 and a power relay 62.

A battery 70 provides power through an ignition switch 71 to a conductor 72. A master switch 73 for operating the control system 45 provides power to a conductor 74. A series of sensors 75, 76, 77, 78, 79, 80 each control an associated relay 81, 82, 83, 84, 85, 86. The relays 81–86 have contacts which are essentially connected in series to provide power from the conductor 74 to a conductor 87 under proper operating conditions, as will be explained in greater detail.

Each of the relays 81–86 has a solenoid coil which, when energized, is operable to close normally open contacts and to open normally closed contacts. By way of example, relay 81 has a solenoid coil 88. One terminal of the solenoid coil 88 is connected to ground and the other terminal is connected through the circuit overload sensor 75 to the conductor 74. When the circuit overload sensor 75 senses an overload, it opens to de-energize the relay coil 88. De-energization of the solenoid coil 88 opens the normally open contacts 89, 90. By this arangement, the relays 81–86 can each serve to break the electrical connection between the conductors 74 and 87.

The over-speed relay 82, the backup sensor relay 83, the engine speed sensor relay 84, and the stop-go relay 86 each have solenoid coils which control normally open contacts in the manner of the circuit overload relay 81. The brake sensor relay 79 is coupled in electrical series with the engine speed sensor 78 and includes normally closed contacts 91, 92. When the brake sensor 79 is energized by energization of the vehicle's brake system, the contacts 91, 92 open to de-energize the engine speed sensor and the engine speed relay 84.

Assuming that proper operating conditions are sensed by the sensors 75–80, power will be supplied to the conductor 87. The axle speed selector relay 60 will then either selectively deliver power from the conductor 87 to the conductor 46 or the conductor 47. A road-speed sensor in the form of a hi-low switch 100 is provided to selectively energize or de-energize the relay 60. When the relay 60 is energized, power will be supplied to the conductor 46. When the relay 60 is de-energized, power will be supplied to the conductor 47. The sensor switch 100 may be manually over-ridden by a manual switch (not shown) located in the operator's cab. Under normal operating conditions, the road speed sensor switch 100 will automatically energize or de-energize relay 60 when the vehicle has attained a predetermined road speed.

A conrol relay 105 is provided with solenoid coils 106, 107. The control relay is of the latching type. When the solenoid coil 106 is energized, the relay 105 will position its contacts as shown in FIG. 3. When the solenoid coil 107 is energized, the relay 105 will close the contacts which are shown open in FIG. 3 and open the closed contacts.

The control relay 105 operates in response to the energization or de-energization of the axle speed selector relay 60. When the axle speed selector relay is energized power will be supplied from conductor 87 to conductor 46. Relay contacts 108, 109 then serve to energize the solenoid coil 107. Upon energization of the coil 107, the relay solenoid moves in the direction of arrow 110. Such movement opens contacts 108, 109 de-energizing the solenoid coil 107, but the solenoid remains latched in its new position.

Subsequently, when the axle speed selector relay is de-energized, power will be supplied from conductor 87 to conductor 47. Relay contacts 111, 112 will then be closed and will serve to energize the solenoid coil 106. Energization of the coil 106 will serve to move the relay solenoid in the direction of arrow 113 thereby opening the contacts 111, 112. The solenoid will again remain latched in its new position, i.e., the position shown in FIG. 3. Hence, the position of relay 105 as shown in FIG. 3 is one which corresponds to the de-energized position or low speed position of the axle speed selector relay 60.

The control relay 105 serves to selectively direct current from the conductor 87 to conductors 120, 121. Relay contacts 122, 123 close in response to low speed selection, and relay contacts 123, 124 close in response to high speed selection. In a similar fashion, relay contacts 125, 126, 127 serve to selectively direct current from the conductor 72 to conductors 128, 129. Contacts 125, 126 close in response to low speed selection, and contacts 126, 127 close in response to high speed selection.

The energization of three relays 130, 131, 132 is controlled by the contacts 125, 126, 127. The relay 130 is termed the synchronization relay, and has a solenoid coil 133. The relays 131, 132 are respectively termed downshift and upshift relays, and have solenoid coils 134, 135. Each of the solenoid coils 133, 134, 135 has one terminal connected to ground. The other terminal of the coil 135 connects with the conductor 128, while the other terminals of the coils 133, 134 connect with the conductor 129. By this arrangement, when the control relay 105 is in the high speed position, current is supplied to the relay coils 133, 134 to energize the synchronization and downshift relays 130, 131. When the control relay is in the low speed position, current is supplied to the relay coil 135 to energize the upshift relay 132.

A resistive-capacitive capacitor charging circuit is connected in parallel with each of the coils 133, 134, 135. The coil 133 has a capacitor 140 and resistor 141 associated therewith, while the coil 134 has a capacitor 142 and a resistor 143, and the coil 135 has a capacitor 144 and a resistor 145. The resistive-capacitive circuits each serve to charge their respective capacitors during energization of their associated relay coils. Upon de-energization of the relay coils by switching of the control relay 105, such of the capacitors as may have been charged will discharge through their associated relay coil and serve to maintain energization of the coil for a brief time interval. By proper selection of the resistor and capacitor values, these time intervals may be pre-selected to a very accurate length, as is well-known.

The synchronization, downshift and upshift relays 130, 131, 132 are interconnected with the in-gear responsive relay 61 and the power relay 62. It is the function of these interconnected relays to control the delivery of power from conductor 87 to the conductors 54 and 55.

The in-gear responsive relay 61 has a solenoid coil 150 which is energized or de-energized depending on the conductivity or non-conductivity of an in-gear sensor 151. The in-gear sensor 151 is adapted to sense engagement of the input 31 with the outputs 32, 33. When the input 31 is in engagement with either of the outputs, the in-gear sensor 151 is conductive. Relay 61 is therefore de-energized as shown in FIG. 3 only when input 31 is not in engagement with either of the outputs 32, 33.

When the in-gear sensor senses non-engagement of the input 31, relay contacts 152, 153 supply current from the conductor 87 to the conductor 54. Simultaneously, contacts 154, 155 connect conductors 55 and 156. When the in-gear sensor 151 senses engagement of the input 31, relay contacts 152, 153 and 154, 155 open, and contacts 153, 157 close to supply current from the conductor 72 to the conductor 54.

The power relay 62 has a solenoid coil 160 which is energized or de-energized depending on whether or not the relays 131, 132 supply current to a conductor 161. When the power relay 62 is de-energized, contacts 163, 164 close to connect conductors 87 and 165. When the power relay 62 is energized, contacts 164, 166 close to connect the conductors 87 and 55. By this arrangement if the power relay is energized, it will directly supply power from the conductor 87 to the conductor 55. If, however, the power relay is de-energized, power may be supplied from conductor 165 through the synchronization and in-gear responsive relays 139, 61 to the conductor 55. The synchronization relay 130 has normally closed contacts 170, 171 respectively connected to conductors 156, 165. When the synchronization and in-gear responsive relays 130, 61 are de-energized, a conductive path is provided between conductors 165 and 55.

The down shift and upshift relays 131, 132 have interconnected contacts which serve to control the supply of power from the conductors 120, 121 to the conductor 161. The conductors 120, 121 respectively connect with contacts 180, 181. Three pairs of contacts 182, 183, and 184, 185 and 186, 187 are respectively connected by conductors 188, 189, 190.

The solenoid coils 134, 135 of the downshift and upshift relays 131, 132 are connected through the control relay 105 to the conductor 72 such that the control relay 105 to the conductor 72 such that the control relay either connects one or the other of the coils 134, 135 to the conductor 72 for energization.

When the downshift relay 131 is energized by contacts 126, 127, current will be supplied from the conductor 121 through the contacts 181, 182 to the conductor 188. Assuming that the upshift relay 132 is de-energized, contacts 183, 187 will connect the conductors 188, 190 to energize the power relay 62. Similarly when the upshift relay 132 is energized by contacts 125, 126, current will be supplied from the conductor 120 through the contacts 180, 184 to the conductor 189. Assuming that the downshift relay 131 is de-energized, the contacts 185, 186 will connect the conductors 189, 190 to energize the power relay 62. However, if both of the relays 131, 132 are simultaneously energized, the open contacts 185, 186 and 183, 187 will prevent the energization of the power relay 62.

Operation of the two speed drive system of the present invention may be described as follows. With the ignition switch 71 and the master switch 73 closed, power will be supplied from the battery 70 to the conductors 72 and 74. As the sensors 75–80 sense a normal running condition wherein the vehicle is moving in a forward direction within a predetermined engine speed range, the relays 81–86 will supply current to the conductor 87.

The road speed sensor switch 100 will then signal the high or low speed of the vehicle, energizing or de-energizing the relay 60 accordingly. Assuming that the low speed position has been selected, the control relay 105 will be in the position illustrated in FIG. 3. When in the low speed position, the conrol relay 105 serves to energize the upshift relay 132 and to de-energize the synchronization and downshift relays 130, 131. With the downshift delay de-energized and the upshift relay energized, current will be supplied from the conductor 87 to the power relay 62. The energized power relay 62 will, in turn, supply current directly from the conductor 87 through the contacts 164, 166 to the motive power source conductor 55. The motive power source will thereby be energized.

When the road speed sensor 100 signals an upshift by moving to its conductive positions, the axle speed selector relay 60 will be energized. Energization of the axle speed selector relay 60 will supply current from the conductor 87 to the conductor 46. The high speed gear actuator 42 will then cause the drive input 31 to commence movement in the direction of the high speed output 32. Simultaneously, the control relay will be caused to move in the direction of arrow 110 to open the contacts 125, 126 and 122, 123 and to close the contacts 126, 127 and 123, 124. The opening of the contacts 125, 126 discountinues the supply of current from the conductor 72 to the coil 135 to the upshift relay 132. However, the upshift relay is maintained in an energized configuration by discharge of the capacitor 144 for a preselected time interval. Simultaneously, closing of the contacts 126, 127 supplies energy to the coils 133, 134 of the synchronization and downshift relays 130, 131. Hence, for a brief time interval, the downshift and upshift relays 131, 132 will both be energized. With both such relays energized, the supply of current to the conductor 161 will be cut off and the power relay 62 will be de-energized. The de-energization of the power relay 62 discontinues the supply of current from the conductor 87 to the conductor 55, and the motive power source is thereby de-energized.

During the brief interval when both the downshift and the upshift relays 131, 132 are simultaneously energized, the motive power source and the drive input 31 will decelerate. When the capacitor 144 has completed its discharge, the upshift relay will be de-energized and current will be permitted to flow from the conductor 188 to the conductor 190 to re-energize the power relay 62 and the motive power source. By this time, the drive input 31 should already be in engagement with the high speed output 32.

When the road speed sensor 100 signals a downshift by moving to its nonconductive position, the axle speed selector relay 60 de-energized. De-energization of the axle speed selector relay 60 will supply current from the conductor 87 to the conductor 47. with the conductor 47 energized, the low speed gear actuator 43 will begin movement of the drive input 31 to disengage it from the high speed drive output 32 and to engage it with the low speed drive output 33. Simultaneously, the control relay 105 will be caused to move in the direction of the arrow 113 and to assume the configuration shown in FIG. 3. Such movement of the control relay will serve to open the contacts 126, 127 and 123, 124 and to close the contacts 125, 126 and 122, 123. Opening of the contacts 126, 127 will discontinue the supply of current from the conductor 87 to the coils 133, 134 of the synchronization and downshift relays 130, 131. However, the capacitor 140, 142 which have been charged during the energization of these relays, will discharge for pre-selected time intervals to maintain the relays 130, 131 in an energized configuration.

Simultaneously, closing of the contacts 125, 126 will serve to energize the upshift relay 132. Hence, for a brief interval of time, all three of the relays 130, 131, 132 will be energized. Concurrent energization of the downshift and upshift relays, will once again, discontinue the supply of current to the power relay 62. With the power relay 62 de-energized, the flow of current from conductor 87 to the motive power source conductor 55 will be discontinued and the motive power source will be de-energized.

De-energization of the power relay 62 also closes the contacts 163, 164 completing electrical connection between the conductors 87, 165. When the synchronization relay capacitor 140 completes its discharge, the synchronization relay will de-energize thereby closing the contacts 170, 171. Closing of the contacts 170, 171 will serve to connect the conductors 165, 156 thereby supplying current from the conductor 87 to the conductor 156. As soon as the in-gear responsive relay 61 senses disengagement between the drive input 31 and the high speed output 32, the contacts 154, 155 will close to supply current from the conductor 87 to the motive power source 55.

By this arrangement, during the concurrent energization of the downshift and upshift relays and the de-energization of the synchronization relay, the motive power source will be reactivated to provide a timed acceleration of the drive input 31 to bring it up to the speed of the low speed output 33. Upon engagement of the drive input 31 and the low speed output 33, the in-gear responsive relay will be re-energized to open contacts 154. 155. The opening of the contacts 154, 155 will discontinue the flow of current from the conductor 87 through the in-gear responsive relay to the conductor 55 and the motive power source will again be de-energized.

As soon as the downshift capacitor relay 142 completes its discharge, the downshift relay will be de-energized and the contacts 185, 186 will close to supply current to the power relay 62. Energization of the power relay 62 will then re-energize the motive power source. Hence, by this arrangement, a timed acceleration is provided for the drive input 31 during downshifting of the drive system.

If the operator decides to lock the drive system in neutral, he may close the switch 53 to energize the neutral lock relay 52. Energization of the neutral lock relay 52 will open the switches 48, 49 to de-energize both the high speed and low speed gear actuators 42, 43. The neutral lock switch 53 is operative when the in-gear responsive relay 61 senses an out-of-gear condition, since current is supplied by the contacts 153, 157 from the conductor 72 to the conductor 54. The neutral lock is also operative when the in-gear responsive relay senses engagement of the drive input 31 with either of the drive outputs 32, 33 since the contacts 152, 153 will be then closed to supply current from the conductor 87 to the conductor 54.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An auxiliary drive for an over-the-highway load carrying vehicle including a two speed drive means, comprising:
   a. drive input means adapted for connection to a source of motive power, said drive input means being selectively engageable with high speed drive output means and low speed drive output means;
   b. actuator means adapted to initiate engagement of said drive input means selectively with either of said output means;
   c. control means adapted to regulate the speed at which said drive input means is driven and adapted to control said actuator means;
   d. said control means being operable to effect downshifting of said input means from engagement with said high speed output means to engagement with low speed output means, and being operable to effect upshifting of said input means from engagement with said low speed output means to engagement with said high speed output means;
   e. said control means being operable to de-energize said input means during disengagement and engagement with said output means;
   f. said control means additionally including timing means operable to provide a timed deceleration of said input means during upshifting and to provide a timed acceleration of said input means during downshifting, whereby said input means is more nearly brought to the speed of the output means it is about to engage;
   g. said control means being adapted to energize and deenergize said motive power means whereby the speed of said input means may be controlled;
   h. said control means being operable to de-energize said motive power means during engagement and disengagement of said input means with said output means;
   i. said control means being operable to re-energize said motive power means during said downshift to provide acceleration of said input means; and,
   j. said control means including timing means operable to de-energize said motive power means for a first preselected interval of time during upshifting, to de-energize said motive power means for a second preselected interval of time during said downshifting, and to re-energize said input means for a third preselected interval of time during said downshifting.

2. An auxiliary drive for an over-the-highway load-carrying vehicle including a two-speed drive means, comprising:
   a. drive input means adapted for connection to a source of motive power, said drive input means being selectively engageable with high speed drive output means and low speed drive output means;
   b. actuator means adapted to initiate engagement of said drive input means selectively with either of said output means;
   c. control means adapted to regulate the speed at which said drive input means is driven and adapted to control said actuator means;
   d. said control means being operable to effect downshifting of said input means from engagement with said high speed output means to engagement with low speed output means, and being operable to effect upshifting of said input means from engagement with said low speed output means to engagement with said high speed output means;
   e. said control means being operable to de-enerize said input means during disengagement and engagement with said output means;
   f. said control means additionally including timing means operable to provide a timed deceleration of said input means during upshifting and to provide a timed acceleration of said input means during downshifting, whereby said input means is more nearly brought to the speed of the output means it is about to engage;
   g. said control means being adapted to energize and de-energize said motive power means whereby the speed of said input means may be controlled, said control means being operable to de-energize said motive power means during engagement and disengagement of said input means with said output means;
   h. said control system being operable to re-energize said motive power means during said downshift to provide acceleration of said input means;
   i. said control means including timing means operable to de-energize said motive power means for a first pre-selected interval of time during said upshifting, to de-energize said motive power means for a second pre-selected interval of time during said downshifting, and to re-energize said input means for a third pre-selected interval of time during said downshifting; and j. said timing means including a first timing means operable to de-energize said motive power means for said first interval of time, a second timing means operable to de-energize said motive power means for a second interval of time, and a third timing means operable to re-energize said motive power means for said third interval of time.

3. The drive system of claim 2 wherein:
   a. said third timing means is adapted to override the operation of said second timing means;
   b. said third time interval is less than said second time interval;
   c. said second and third timing means are connected to simultaneously initiate the running of said second and third time intervals; and, d. said control means includes sensor means adapted to prohibit re-energization of said motive power means by said drive means until said input means has disengaged said high speed output means.

4. The ddrive system of claim 2 wherein each of said timing means includes a relay having a coil which is powered through a resistive-capacitive capacitor charging circuit such that when the power to said relay coil is interrupted, the relay is maintained energized for a preselected time interval by the discharge of said capacitor.

5. A two-speed drive system for use in over-the-highway load-carrying vehicles, comprising:
   a. drive input means adapted for connection to a source of motive power, said drive input means being selectively engageable with high speed drive output means and low speed drive output means;
   b. low speed actuator means adapted to engage said drive input means with said low speed drive output means;
   c. high speed actuator means adapted to engage said drive input means with said high speed drive output means;
   d. control means adapted to downshift said drive input means from engagement with said high speed output means to engagement with said low speed output means by de-energizing siad high speed actuator, means, accelerating the drive input means for a pre-determined period of time, and then energizing said low speed actuator means;
   e. said control means including in-gear sensor means to prohibit the acceleration of said drive input means during downshifting until said drive input means had disengaged said high speed output means;
   f. said control means further adapted to upshift said drive input means from engagement with said low speed output means to engagement with said high speed output means by de-energizing said low speed actuator means, timing a pre-determined interval of time, and energizing said high speed actuator means;
   g. said control means operable to de-energize said input means during disengagement and engagement with said output means; and
   h. said control means including a first timing means operable to de-energize said input means for a first pre-selected interval of time during upshifting, a second timing means operable to de-energize said input means for a second pre-selected interval of time during downshifting, and a third timing means operable to re-energize said input means during said second time interval for a third pre-selected interval of time which is less than said second time interval.

* * * * *